United States Patent
Yoshida et al.

[11] Patent Number: 6,137,486
[45] Date of Patent: Oct. 24, 2000

[54] IMAGE DISPLAY CONTROL DEVICE FOR RESTRICTING DISPLAY OF VIDEO DATA VIEWED ON A TELEVISION IN ACCORDANCE WITH A RESTRICT LEVEL OF THE VIDEO DATA

[75] Inventors: Takeshi Yoshida; Masaru Tonozuka, both of Moriguchi, Japan

[73] Assignee: Sanyo Electric Co., Ltd., Osaka, Japan

[21] Appl. No.: 08/936,048

[22] Filed: Sep. 23, 1997

[30] Foreign Application Priority Data

Sep. 30, 1996 [JP] Japan ................................. 8-259666
Oct. 8, 1996 [JP] Japan ................................. 8-267355

[51] Int. Cl.⁷ .................................................. H04N 5/445
[52] U.S. Cl. ...................................... 345/327; 348/5.5
[58] Field of Search ........................ 348/5.5, 6, 7, 10, 348/12, 13, 460, 568, 566; 345/327; H04N 4/443

[56] References Cited

U.S. PATENT DOCUMENTS

| | | |
|---|---|---|
| 4,554,584 | 11/1985 | Elam et al. . |
| 4,888,796 | 12/1989 | Olivo . |
| 5,195,135 | 3/1993 | Palmer . |
| 5,253,066 | 10/1993 | Vogel ........................................... 348/7 |
| 5,485,518 | 1/1996 | Hunter et al. ......................... 348/5.5 X |
| 5,550,575 | 8/1996 | West et al. ............................... 348/5.5 |
| 5,629,733 | 5/1997 | Youman et al. ............................ 348/7 |
| 5,715,014 | 2/1998 | Perkins et al. ........................... 348/565 |
| 5,751,335 | 5/1998 | Shintani .................................. 348/5.5 |

*Primary Examiner*—Nathan Flynn
*Attorney, Agent, or Firm*—Hogan & Hartson, LLP

[57] ABSTRACT

For the display of certain video scenes, in a case when first restrict data has a stricter restrict level than second restrict data, an on-screen circuit (5) operating in accordance with the output of a comparator (3) alters the display on the TV screen (6) to a single predetermined color, cutting out the video scene. Alternatively, in the case when first restrict data has a more lenient restrict level than second restrict data, the on-screen circuit (5) operating in accordance with the output of a comparator (3) displays the video scene unaltered. Furthermore, the extent of the difference between restrict levels of first and second restrict data can be checked on the TV screen (6) by means of data set in attribute register (9), making it possible to prevent overly deviant restrict level settings.

20 Claims, 5 Drawing Sheets

IMAGE DISPLAY CONTROL DEVICE FOR RESTRICTING DISPLAY OF VIDEO DATA VIEWED ON A TELEVISION IN ACCORDANCE WITH A RESTRICT LEVEL OF THE VIDEO DATA

BACKGROUND OF THE INVENTION

1. Field of the Invention

The present invention relates to an image display control device for video data which can be viewed on a TV receiver, wherein the image display control device prevents or permits viewing of video scenes included in the video data in accordance with contents thereof.

2. Description of the Related Art

Data broadcast to TV receivers may have a good or bad influence on the development of children who view that data. Recently in the US, in consideration of the healthy growth and education of children, legislation has been introduced to make compulsory the provision of a function for automatically preventing the viewing of video scenes regarded as inappropriate for the growth and education of children (for instance, video scenes of extreme violence, sexual nature, or the like) for the period of their broadcast during certain programs broadcast on TV receivers with screen-width of 13-inches or above.

The XDS (eXtended Data Service) is provided in North America and Canada The XDS now offers the information included program information (i.e. station ID and Network and Program Name), time information, a weather forecast, and so on. XDS data is multiplexed on the 21st horizontal tracking period of the vertical retrace of a video signal transmitted from a TV broadcasting station or a video signal played-back on a VCR or the like, and has same structure with the caption standard on the XDS.

More specifically, the above-mentioned function is realised by using 1 XDS data (program rating) for text display and the like which is multiplexed on the video signal.

When preventing viewing of video scenes regarded as inappropriate for moral (i.e. the growth and education of children) while viewing a certain program on a TV receiver, the broadcasting station sends numerous types of restrict data which are multiplexed onto the 21H of the vertical retrace period so that viewing can be permitted or prevented in accordance with the level of appropriateness. The restrict data is extracted from the video signal and decoded, and viewing of the TV image is prevented (for instance, the whole screen displays a predetermined color) in accordance with the decoded result.

However, the restrict level determined by the broadcasting station is not necessarily the same as the restrict level desired by viewers who view the broadcast pictures on TV receivers. In other words, there are cases where the broadcasting station wishes to restrict viewing but a viewer does not, or vice versa. However, with conventional technology, image display is restricted only according to a restrict level set by the broadcasting station, and the wishes of the viewer are not reflected.

SUMMARY OF THE INVENTION

It is the aim of the present invention to provide an image display control device capable of comparing the display restrict level of video signals such as those regarded as inappropriate for children, said video signals broadcast from a broadcasting station, with a restrict level set by a viewer, and permitting or preventing viewing of the video scene based on the result of this comparison.

In order to achieve the above and other objectives, the present invention comprises an image display control device for preventing viewing of video scenes regarded as educationally inappropriate. These video scenes are included in video data capable of being viewed on a television, while said image display control device comprises: an extractor for extracting from a video signal first restrict data which has been multiplexed in a predetermined vertical retrace period of the video signal, said first restrict data representing any one of a plurality of display restrict levels ranging from a strict display restrict level for preventing viewing of video scenes regarded as educationally inappropriate to a lenient display restrict level; a register in which is set second restrict data representing any one of the plurality of display restrict levels; and a display controller for comparing display restrict levels of the first restrict data and the second restrict data, prohibiting display of the video data on a television display when a display restrict level of the first restrict data is stricter than a display restrict level of the second restrict data, and permitting display of the video data on a television display when the display restrict level of the first restrict data is more lenient than the display restrict level of the second restrict data.

In the present invention, the broadcast receiver can set second restrict data and can control the display of video data on the television by comparing the second restrict data with first restrict data multiplexed on a video signal which is actually broadcast.

In other words, according to the present invention, when preventing the viewing on a television of video scenes regarded as inappropriate for the growth or education of children, a comparison is made between a first restrict level set by the transmission source, namely the television broadcasting station, and a second restrict level set by the television users, including parents and guardians of children. Performance of a display restrict operation is controlled based on the result of the comparison.

In another aspect of the present invention, the display controller further comprises a comparator for comparing the first restrict data with the second restrict data and an on-screen circuit for displaying a predetermined display color on a display-screen when the output of the comparator has indicated that the display restrict level of the first restrict data is stricter than the display restrict level of the second restrict data.

Furthermore, in another aspect of the present invention, the display controller further comprises a muting circuit for muting the audio output of the television when the output of the comparator has indicated that the display restrict level of the first restrict data is stricter than the display restrict level of the second restrict data.

When displayed video data is of a level regarded as educationally inappropriate, the corresponding audio output is very often similarly inappropriate. Therefore, viewing of educationally inappropriate broadcasts can be reliably restricted by muting the audio output together with the video data displayed on the display-screen in accordance with a display restrict level.

In another aspect of the present invention, the image display control device further comprises a restrict level display controller for controlling the on-screen circuit in order to display the difference between the display restrict level of the second restrict data and the display restrict level of the second restrict data, based on a comparison between first and second restrict data performed by the comparator.

Another further aspect of the present invention also comprises a register, in which data representing a first color is set when the display restrict level of the first restrict data is stricter than the display restrict level of the second restrict data, and in which data representing a second color differing from the first color is set when the display restrict level of the first restrict data is more lenient than the display restrict level of the second restrict data; and wherein, based on contents of the register, the on-screen display displays a relative relation between the display restrict level of the first restrict data and the display restrict level of the second restrict data using colors on the display-screen.

Furthermore, in yet another aspect of the present invention, when the display restrict level of the first restrict data does not match the display restrict level of the second restrict data, the restrict level display controller controls the ON-SCREEN CIRCUIT to display a predetermined display on the display-screen.

In a still further aspect of the present invention, when the display restrict level of the first restrict data does not match the display restrict level of the second restrict data, the restrict level display controller controls the ON-SCREEN CIRCUIT to flash a predetermined text on the display-screen.

By displaying data indicating the difference between first restrict data and second restrict data on the display-screen in the manner described above, it is possible to confirm from the display-screen what sort of display restrict level has been set by the broadcasting station, and it is also possible to prevent the setting at the receiving side of a display restrict level which deviates markedly from a first restrict level set by the broadcasting station, said first restrict level approximating a socially average level. Furthermore, since it is possible to learn the difference between the first restrict data and the second restrict data, it is consequently easier to learn the reasons for the restrict level settings set by the broadcasting station.

In another aspect of the present invention, the image display control device comprises an extractor for extracting from a video signal first restrict data which has been multiplexed in a predetermined vertical retrace period of the video signal, said first restrict data representing any one display restrict level of a plurality of display restrict levels ranging from a strict display restrict level for preventing viewing of video scenes regarded as educationally inappropriate to a lenient display restrict level; a register in which is set second restrict data representing any one of the plurality of display restrict levels; a display controller for comparing display restrict levels of the first restrict data and the second restrict data, and prohibiting display of the video data on a television display when a display restrict level of the first restrict data is stricter than a display restrict level of the second restrict data, and permitting the television to display the video data when the display restrict level of the first restrict data is more lenient than the display restrict level of the second restrict data; and a prohibit circuit, wherein, having switched from a first state of viewing video data corresponding to a video signal onto which has been multiplexed the first restrict data, having a more lenient display restrict level than the second restrict data to a second state of viewing video data corresponding to a different video signal onto which has been multiplexed the first restrict data, having a stricter display restrict level than the second restrict data, the prohibit circuit prohibits display of the video data on the display-screen from the moment of switching from the first state to the second state to the moment at which, after the first restrict data multiplexed on the video signal obtained in the second state has been extracted, the restrict level display controller controls the display of the video data on the display-screen in accordance with the extracted first restrict data.

With the above configuration, in a case where the person viewing the television is a child, when the display channel is switched from a program with little need for restriction of video scenes, namely a program having a low restrict level, to a program with considerable need for restriction of video scenes, namely a program having a high restrict level, even if first restrict data cannot be obtained from the video signal of the channel which immediately follows this change, it is possible to prevent the display of inappropriate video data until this first restrict data is obtained and corresponding display control is carried out.

In another aspect of the present invention, the image display control device comprises a extractor for extracting from a video signal first restrict data which has been multiplexed in a predetermined vertical retrace period of the video signal, said first restrict data representing any one display restrict level among a plurality of display restrict levels ranging from a strict display restrict level for preventing viewing of video scenes regarded as educationally inappropriate to a lenient display restrict level; a register in which is set second restrict data representing any one of the plurality of display restrict levels; a first comparator for comparing a display restrict level of the first restrict data with a display restrict level of the second restrict data; an on-screen circuit for prohibiting viewing of corresponding video data based on an output of the first comparator which indicates that the display restrict level of the first restrict data is stricter than the display restrict level of the second restrict data, and for permitting viewing of corresponding video data based on an output of the first comparator which indicates that the display restrict level of the first restrict data is more lenient than the display restrict level of the second restrict data; a present channel register into which is set data relating to a channel on which video data is presently being viewed; a preserve register for preserving the contents of the present channel register based on an output of the first comparator which indicates that the display restrict level of the first restrict data is stricter than the display restrict level of the second restrict data; a second comparator for comparing the contents of the present channel register with the contents of the preserve register and, when said contents match, controlling the on-screen circuit to prohibit viewing of the corresponding video data, irrespective of the output of the first comparator; and wherein, having switched from a first state of viewing video data corresponding to a video signal onto which has been multiplexed the first restrict data having a display restrict level stricter than the display restrict level of the second restrict data to a second state of viewing video data corresponding to a different video signal onto which has been multiplexed the first restrict data having a more lenient display restrict level than the second restrict data, and having thereafter switched once again to the first state; and the video data is prohibited from being displayed on the display-screen of the television in compliance with an output of the first comparator during the period from the moment of switching from the second state to the first state until, after extracting the first restrict data multiplexed onto a video signal obtained in the second state from the video signal, the on-screen circuit is controlled by an output of the first comparator.

With the above configuration, even when a channel is temporarily switched from a first state with a strict restrict level to a second state with a lenient restrict level and is then switched back to the strict first state, it is possible to reliably prevent inappropriate video data from being displayed on the display-screen before extracting first restrict data from a video signal obtained in the final strict first state and restricting display in accordance therewith.

Furthermore, the present invention comprises an image display control device for obtaining video data capable of being viewed on a television from a video signal and displaying the video data on a display-screen of the television, wherein in accordance with moral contents of the video signal, the video signal is ranked at any one of a plurality of display restrict levels ranging from a strict display restrict level to a lenient display restrict level, and first restrict data for restricting display on the display-screen is multiplexed onto the video signal in accordance with a display restrict level at which the video signal has been ranked.

This aspect further comprises an extracting circuit for extracting the first restrict data which has been multiplexed onto the video signal; a second restrict data storing circuit for storing second restrict data which corresponds to a display restrict level desired by a viewer; a display controller for comparing display restrict levels of the first restrict data and the second restrict data, and prohibiting display of the video data on a television display when a display restrict level of the first restrict data is stricter than a display restrict level of the second restrict data, and permitting display of the video data on a television display when the display restrict level of the first restrict data is more lenient than the display restrict level of the second restrict data.

Furthermore, in another aspect of the present invention, the first restrict data multiplexed onto the video signal in accordance with moral contents of the video signal comprises restrict data for preventing viewing of video scenes deemed to be educationally inappropriate.

Another aspect of the present invention further comprising a prohibit circuit, wherein, having switched from a first state of viewing video data corresponding to a video signal onto which has been multiplexed the first restrict data having a display restrict level more lenient than the display restrict level of the second restrict data to a second state of viewing video data corresponding to a different video signal onto which has been multiplexed the first restrict data having a stricter display restrict level than the second restrict data, during the period from the moment of switching from the first state to the second state until, after extracting the first restrict data multiplexed onto a video signal obtained in the second state from the video signal, the on-screen circuit is controlled by an output of the first comparator, and said prohibit circuit prohibits the video data in the second state from being displayed on the display-screen.

In another aspect of the present invention, the above-mentioned image display control device further comprises a present channel register into which is set data relating to a channel of video data presently being viewed on the display-screen; a preserve register for preserving the contents of the present channel register when an output of the first comparator which indicates that the display restrict level of the first restrict data is stricter than the display restrict level of the second restrict data; a channel comparator for comparing the contents of the present channel register with the contents of the preserve register and, when said contents match, controlling the on-screen circuit to prohibit viewing of the corresponding video data, irrespective of the output of the first comparator; and wherein, having switched from a first state of viewing video data corresponding to a video signal onto which has been multiplexed the first restrict data having a display restrict level stricter than the display restrict level of the second restrict data to a second state of viewing video data corresponding to a different video signal onto which has been multiplexed the first restrict data having a more lenient display restrict level than the second restrict data, and having thereafter switched once again to the first state, during the period from the moment of switching from the second state to the first state until after extracting the first restrict data multiplexed onto a video signal obtained in the second state from the video signal, the on-screen circuit is controlled by an output of the first comparator, the video data is prohibited from being displayed on the television in compliance with an output of the channel comparator.

Furthermore, in another aspect of the present invention, the image display control device may control both the first state and the second state so that, when a comparison between the first restrict data and the second restrict data has indicated that the display restrict level of the first restrict data is stricter than the display restrict level of the second restrict data, a predetermined color is displayed on the television display.

Furthermore, in another aspect of the present invention, the image display control device further comprises a switch time display controller, wherein, having switched from a first state of displaying video data corresponding to a video signal to a second state of displaying video data corresponding to a different video signal, the switch time display controller prohibits the video data in the second state from being displayed on the display-screen during the period from the moment of switching from the first state to the second state until, after the first restrict data multiplexed onto the video signal obtained in the second state is extracted from said video signal.

Furthermore, in another aspect of the present invention, the image display control device further comprises a switch time display controller, wherein, having switched from a first state of displaying video data corresponding to a video signal to a second state of displaying video data corresponding to a different video signal, the switch time display controller prohibits the video data in the second state from being displayed on the display-screen for a predetermined period of time from the moment of switching from the first state to the second state.

With the above configuration, when switching from the first state to the second state, display is first temporarily prohibited, irrespective of the display restrict levels of video signals obtained in the first and second states, until the display is controlled in accordance with the display restrict level of the video signal obtained in the second state.

Furthermore, in another aspect of the present invention, the switch time display controller, when the first restrict data is not detected from a video signal obtained in the second state within a predetermined period of time from the moment of switching from the first state to the second state, the switch time display controlled may cancel the display prohibit prohibiting the video data of the second state from being displayed on the display-screen.

With the above configuration, in a case when, for instance, no restrict data is appended to a video signal obtained in the second state, although display is temporarily restricted at the switch from the first state to the second state, the display prohibit state is cancelled until after a predetermined period of time has elapsed, even if no first restrict data was detected.

Thus it is possible to prevent the display prohibit from continuing, even though no first restrict data has been detected from the video signal in the second state. This is particularly effective when the video signals supplied to the device include signals to which no display restrictions have been appended. Furthermore, in cases where the video signal obtained in the second state after switching has a display restriction, but as a result of, for instance, wave damage or the like, first restrict data cannot be obtained over a long period which exceeds the normal multiplex interval of first restrict data, it is possible to permit viewing of video data corresponding to the second state video signal and to prevent the display restriction from continuing, on the grounds that first restrict data cannot be obtained due to the excessive time period.

BRIEF DESCRIPTION OF THE DRAWINGS

The present invention will be understood more fully from the detailed description given here-below and from the accompanying drawings of the preferred embodiments of the invention. However, the drawings are not intended to imply limitation of the invention to these specific embodiments, but are for explanation and understanding only.

In the diagrams.

DESCRIPTION OF THE PREFERRED EMBODIMENTS

The first preferred embodiment of the present invention will next be explained with reference to the accompanying drawings.

Figure 1:
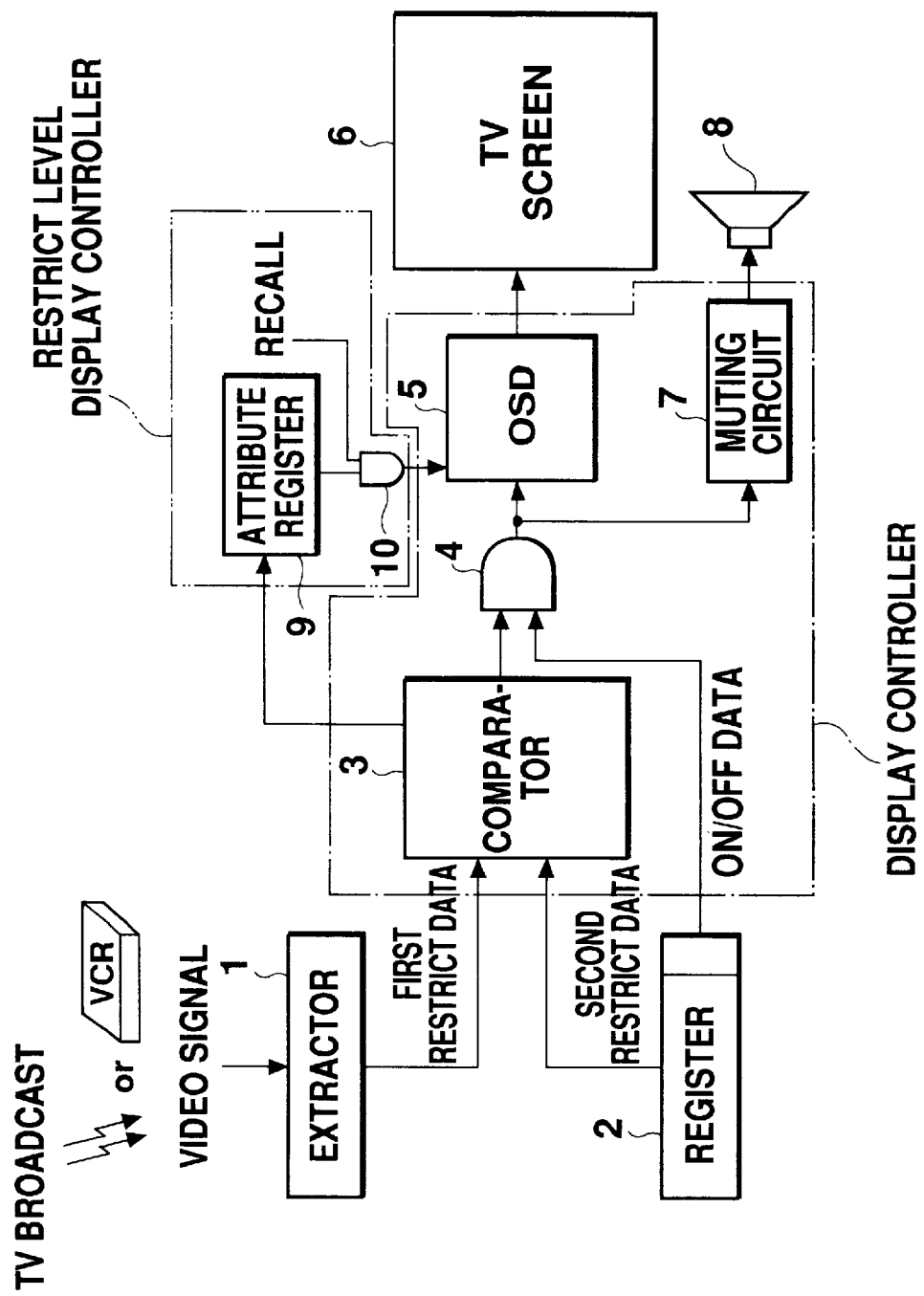
FIG. 1 is block diagram depicting an image display control device in a first embodiment of the present invention.

FIG. 1 is block diagram depicting a first embodiment of the image display control device according to the present invention.

In FIG. 1, extractor (1) extracts data consisting of logic "1" (high level) or logical "0" (low level) multiplexed onto the 21st horizontal tracking period (21H) of the vertical retrace period of a video signal, then slices the data to half the high or low level and outputs it as clear "1" or "0" digital data. The data multiplexed onto 21H of the video signal vertical retrace period is the same as in a closed-caption system, wherein the uppermost bit of, for instance, eight bits of multiplexed data is a parity bit, and the lower three bits are allocated as first restrict data representing a restrict level for a video scene. This first restrict data is transmitted together with the video signal at an interval of a few seconds to a few minutes.

Resister (2) is a 4-bit register. Three predetermined bits are allocated as a bit region in which to set any one of eight types of second restrict data (in other words, the second restrict data has the same number of types as the first restrict data sent from the broadcasting station). When the video signal which has been broadcast is regarded as morally inappropriate for the growth or education of children, the remaining one bit is set to "1" if viewing is to be prohibited, or set to "0" is viewing is not to be prohibited.

First restrict data obtained from extractor (1) and second restrict data obtained from register (2) are both sent to a display controller comprising a comparator (3), an AND gate (4), an on-screen circuit (OSD) (5) and a muting circuit (7). The display controller compares the display restrict levels of the first and second restrict data. When the display restrict level of the first restrict data is stricter than the display restrict level of the second restrict data, the display controller prohibits the video scene from being displayed on the display (television screen) and also prohibits the corresponding audio output. Alternatively, when the display restrict level of the first restrict data is more lenient than the display restrict level of the second restrict data, the display controller permits the display of the video scene on the TV screen and permits the corresponding audio output.

Furthermore, the restrict level display controller shown in FIG. 1 comprises an attribute register (9) and an AND gate (10). The restrict level display controller controls the ON-SCREEN CIRCUIT (5) to display the difference in display restrict level of the second restrict data with respect to the first restrict data on the TV screen in compliance with the comparison between the first and second restrict data performed by comparator (3).

The configuration of each circuit will next be explained in detail.

The comparator (3) is a circuit for comparing the restrict levels of first restrict data extracted by extractor (1) and second restrict data set in register (2). More specifically, when the restrict level of the first restrict data set at the broadcasting station is stricter than the restrict level of the second restrict data set by the viewer, comparator (3) outputs logical "1". Conversely, when the first restrict data is more lenient than the second restrict data, comparator (3) outputs logical "0". As an example, let us consider a case where the first restrict data for a certain video scene specifies: "prohibit viewing for children under 17 years of age"whereas the second restrict data set in the register specifies: "prohibit viewing for children under 13 years of age." Here, since the first restrict data is stricter than the second restrict data, the display restrict level set by the broadcasting station is given priority over the viewer's restrict level. Conversely, consider a case where the first restrict data for a certain video scene specifies: "prohibit viewing for children under 17 years of age" as above, whereas the second restrict data set in the register specifies: "prohibit viewing for children under 18 years of age." Here, since the first restrict data is more lenient than the second restrict data, the display restrict level set by the broadcasting station is similarly given priority over the restrict level set by the viewer and the video scene is broadcast unchanged, in other words, with no viewing restriction.

The output of comparator (3) is applied to one input of AND gate (4); 1-bit data set in register (2), namely 1-bit data for controlling (ON when controlling, OFF when not controlling) whether or not to restrict viewing of a video scene, is applied to the other input of AND gate (4). In other words, when the 1-bit data from the register (2) has logical "1" and is ON, and the first restrict data is stricter than the second restrict data, the AND gate (4) outputs logical "1".

When the logical "1" output from the AND gate (4) is input to the on-screen circuit (5), the on-screen circuit (5) replaces the inappropriate video scene on the TV screen (6) by displaying a predetermined color. For instance, the ON-SCREEN CIRCUIT (5) may display a uniform blue color on the TV screen (6). Furthermore, when the logical "1" output from the AND gate (4) is input to the muting circuit (7), the muting circuit (7) mutes the audio signal synchronised to the video scene by prohibiting output of the audio signal from the speaker (8).

Figure 2:
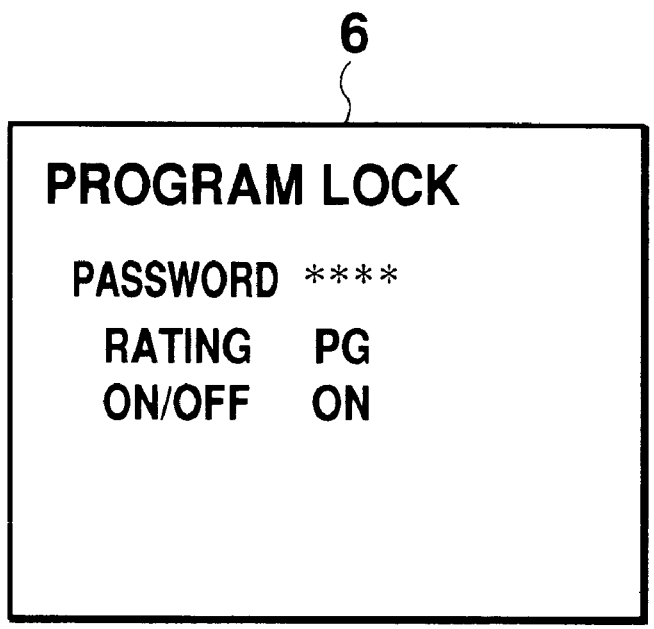
FIG. 2 is diagram depicting one display screen of a TV receiver obtained by the image display control device of the present invention.

Here, when setting data into the register (2), the "Program Lock" depicted in FIG. 2 is displayed on the TV screen (6) in compliance with command input using a TV remote control device. The "Program Lock" display contains a password, second restrict data to be set by the viewer of the TV receiver (Rating), and 1-bit data (ON/OFF). In order to prevent a child from setting the second restrict data and the 1-bit data, the password should be known only by the child's parents or guardians. If there was no password, children would be free to change second restrict data and 1-bit data and consequently be able to view inappropriate video scenes. This can be prevented using a password. Parents or guardians can set second restrict data and 1-bit data by using the remote control device to input the correct password. The respective data are also set using the remote control device. Infrared light output by the remote control device is detected and decoded by the microprocessor containing comparator (3). When the remote control device inputs code PG, which represents a predetermined level of second restrict data, the microprocessor decodes the infrared light corresponding to code PG and three bits of second restrict data corresponding to code PG are set in register (2). Similarly, when the remote control device inputs 1-bit data representing ON, the microprocessor decodes the infrared light corresponding to ON, and "1" corresponding to this ON data is set in the remaining bit in register (2).

In contrast with conventional configurations, which ignore the wishes of the viewer and determine whether to restrict video scene display based only on first restrict data of the broadcasting station, the configuration described above enables video scene display to be controlled based on a comparison result of first restrict data set at the broadcasting station and second restrict data set by the viewer. As a result, video scene display can be controlled according to the wishes of each family.

Here, when preventing viewing of video scenes which are potentially damaging to the growth and education of children, if the parents or guardians were able to know the extent of the difference between the restrict levels of first restrict data sent by the broadcasting station and second restrict data set by the parents or guardians themselves, it would be possible for them to understand the intent behind the broadcasting station's settings of display restrict levels for numerous individual video scenes regarded as inappropriate for children. In other words, the parents or guardians would be able to understand the attitude to such video scenes. The parents or guardians would then be able to set second restrict data which has a restrict level close to that of first restrict data transmitted from the broadcasting station, thereby obtaining consistency between the first and second restrict data. It would therefore be possible to effectively prevent families from setting restrictions for their children which are too strict or too lenient in comparison with the social average, that is to say, socially deviant restrict levels. In order to achieve this, the following constituents are added to the above-mentioned configuration.

Figure 3:
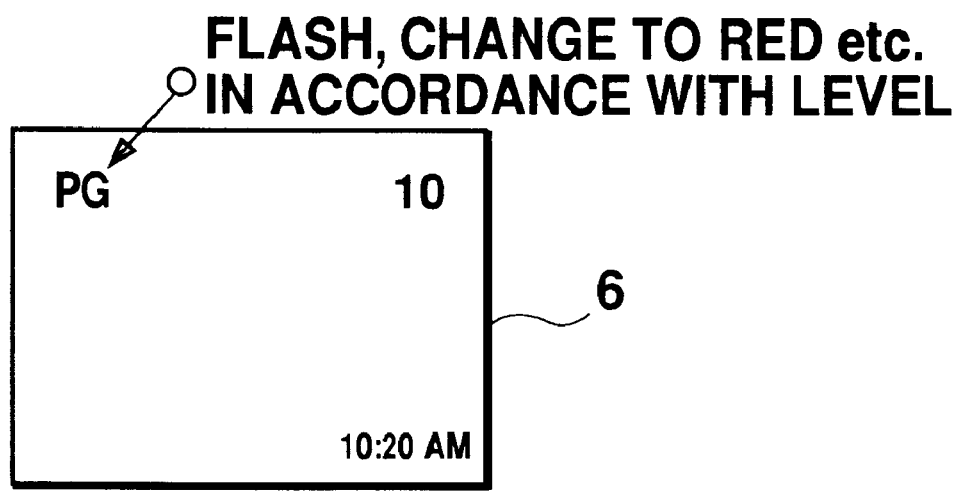
FIG. 3 is a diagram depicting a display screen of a TV receiver obtained in the first embodiment of the image display control device of the present invention.

In accordance with the result of the comparison performed by comparator (3), attribute data representing a predetermined color (for instance, red or green) are set into an attribute register (9). Data set in attribute register (9) is input to the OSD (5), but multiple AND gates (10) are provided between attribute register (9) and OSD (5). The data set in attribute register (9) is applied to one input of each AND gate (10). AND gates (10) are provided with the same number of bits as the data set in attribute register (9) and each bit of the data set in attribute register (9) is applied to one of the inputs of each AND gate (10). Furthermore, the remote control device can be used to display the restrict level (for instance, PG) depicted in FIG. 3 on the TV screen (6). The signal RECALL generated by the remote control device to display the restrict level is decoded by the microprocessor, and logical "1" is applied to the other inputs of each of the AND gates (10). In other words, the first data set in the attribute register (9) following the RECALL signal generated by the remote control device is extracted to the OSD (5).

Figure 4:
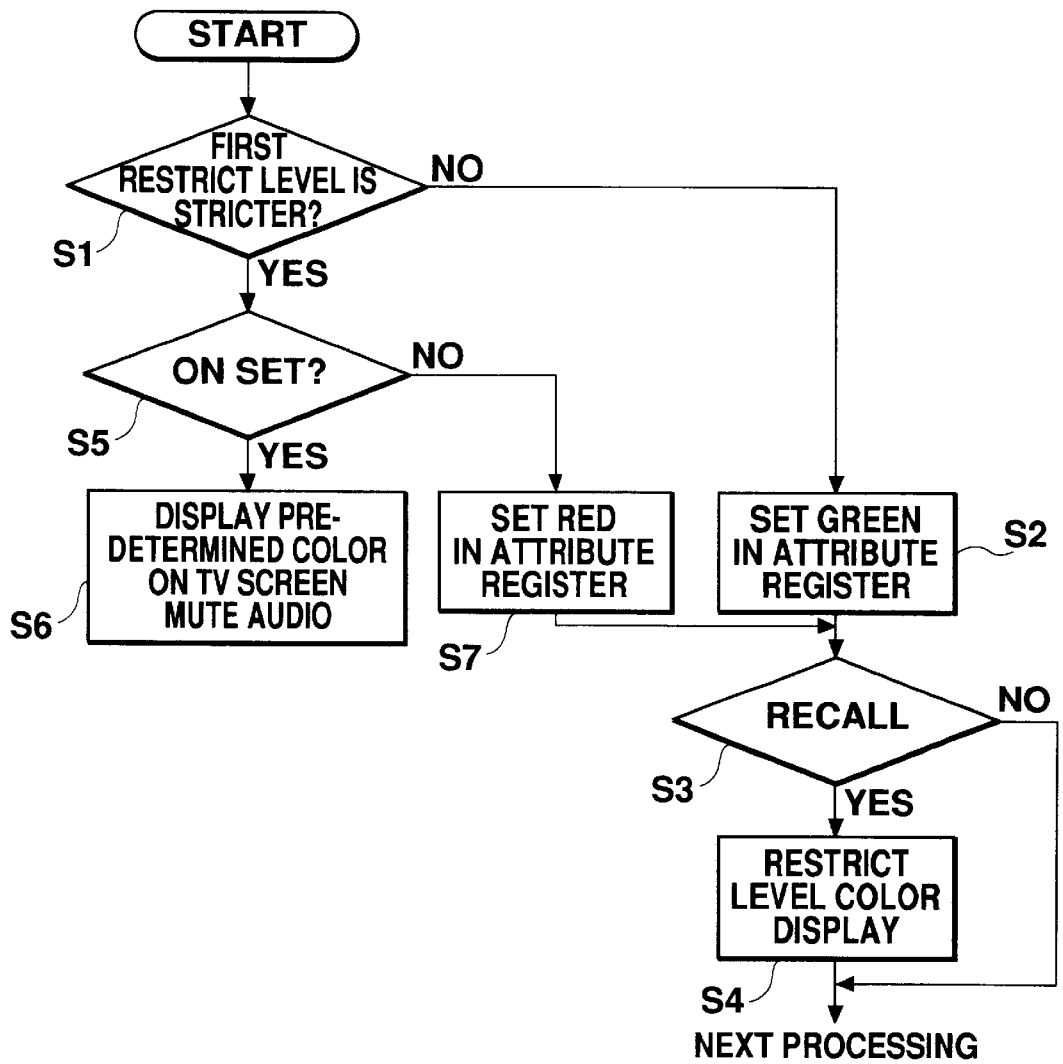
FIG. 4 is a flowchart for explaining the operation of FIG. 1.

Next, the process of displaying a restrict level on the TV screen (6) based on the contents of the attribute register (9) will be explained referring to the flowchart in FIG. 4 which depicting the operation of the microprocessor.

First, the comparator (3) compares the restrict levels of the first restrict data sent from the broadcasting station and the second restrict data set on the TV receiver side (S1). For instance, when first restrict data is more lenient that second restrict data (S1, NO), the comparator (3) sets attribute data for altering the restrict level PG display (shown in FIG. 3) to Green into the attribute register (9), irrespective of the 1-bit data set into register (2) (S2). Thereafter, the remote control device is operated to generate a RECALL signal to recall the display shown in FIG. 3 (S3, YES) and the TV screen (6) alters to the display state in FIG. 3 in compliance with the microprocessor's decoding of the infrared signal. The PG display representing the restrict level is then colored green in accordance with the output from the OSD (5), enabling the viewer to confirm that the first restrict data is more lenient than the second restrict data (S4): To check the extent of the difference in restrict levels between the first and second data, the remote control device can be operated to obtain the display shown in FIG. 2 and alter the restrict level of the second restrict data. By doing so, the viewer can confirm the extent to which the restrict level of the second restrict data must be reduced (i.e. made more lenient) in order to equal the restrict level of the first restrict data.

Alternatively, when first restrict data is stricter that second restrict data (S1, YES), if the 1-bit data in register (2) is set to logical "1" (S5, YES), thereby constituting an instruction (ON) to restrict the display, the OSD (5) operates in compliance with the output of comparator (3) to alter the TV screen (6) to display a single predetermined color; simultaneously, the muting circuit (7) mutes the audio output (S6). Or, when first restrict data is stricter that second restrict data (S1, YES), if the 1-bit data in register (2) is logical "0" (S5, NO), thereby constituting an instruction (OFF) to cancel the display restriction, in accordance with the "0" output of AND gate (4), the OSD (5) stops altering the TV screen (6) to a single predetermined color. Simultaneously, the comparator (3) sets attribute data for altering the restrict level PG display (shown in FIG. 3) to Red into the attribute register (9) (S7). Thereafter, the remote control device generates the RECALL signal to recall the display shown in FIG. 3 (S3, YES) and the TV screen (6) alters to the display state in FIG. 3 in compliance with the microprocessor's decoding of the infrared signal.

The PG display representing the restrict level is then colored red in accordance with the output from the OSD (5), enabling the viewer to confirm that the first restrict data is stricter than the second restrict data (S4). To check the extent of the difference in restrict levels between the first and second data, the remote control device can be operated to obtain the display shown in FIG. 2 and alter the restrict level of the second restrict data. By doing so, it is possible to confirm the extent to which the restrict level of the second restrict data must be increased (i.e. made stricter) in order to equal the restrict level of the first restrict data.

As described above, according to the first embodiment of the present invention, when preventing viewing of video scenes regarded as inappropriate for the growth and education of children, first restrict data sent from the source is compared with second restrict data set at the destination by parents or guardians; based on the result of this comparison, it is determined whether or not to restrict display of the video scene. As a result, video scenes regarded as inappropriate can be restricted with an operation which is more closely in line with the wishes of the viewers at the receiving side than WITH A conventional device. Moreover, since the extent of the strictness/leniency of the first restrict data can be checked on the TV screen (6), setting of socially deviant restrictions can be prevented.

In the above description, attribute data for changing the color of the restrict level display was set into the attribute register (9) in make it possible to check whether first restrict data is stricter than second restrict data. However, the operation is not restricted to this, and, when first restrict data is stricter or more lenient than second restrict data, attribute data for flashing the restrict level display may be set into the attribute register (9) and the OSD (5) may be operated accordingly.

Embodiment 2

In addition to the configuration described above, a second embodiment of the image display control device of the present invention further comprises a function for prohibiting viewing of video scenes inappropriate for children when a channel has been switched.

Because restrict data for preventing or permitting viewing of video scenes regarded as inappropriate for the growth and education of children is multiplexed onto the 21H of the vertical retrace period of the video signal only at intervals of a few seconds to a few minutes, it is highly probable that restrict data for the video data following the channel switch will not be obtained at the same time that the channel is switched.

Let us consider a case in which a video scene regarded as inappropriate for children has been reached while a child is viewing a video signal on channel A, whereupon the TV screen (6) has been covered with a predetermined color in order to prevent viewing of that video scene (state X).

Next, let us suppose that, from state X, the child changes the channel from channel A to channel B which is broadcasting a program which is not inappropriate for children, such as a sports program, for instance. The restrict data multiplexed onto 21H of the vertical retrace period of the channel B video signal is here in its most lenient state, necessitating no restriction, and therefore the display on the TV screen (6) should not be restricted (state Y).

Next, the child changes the channel once again from channel B to channel A. Here, at the moment of changing from channel B to channel A, restrict data for channel A has not yet been multiplexed onto the 2 1H of the vertical retrace period of the video signal, and there is a period of a few seconds to a few minutes until the restrict data arrives. The child is consequently able to view the video scene regarded as inappropriate for children during this period, which is clearly undesirable.

In addition to the elements included in the configuration of the first embodiment, the second embodiment of the image display control device of the present invention further comprises a function for reliably prohibiting a child from viewing video scenes regarded as inappropriate for children in the case when, after viewing a program which requires certain video scenes to be restricted, the child changes the channel and views a program not requiring such restrictions, but then switches the channel back to continue viewing the program which requires restriction.

The second embodiment of the present invention will next be explained in detail with reference to the diagrams.

Figure 5:
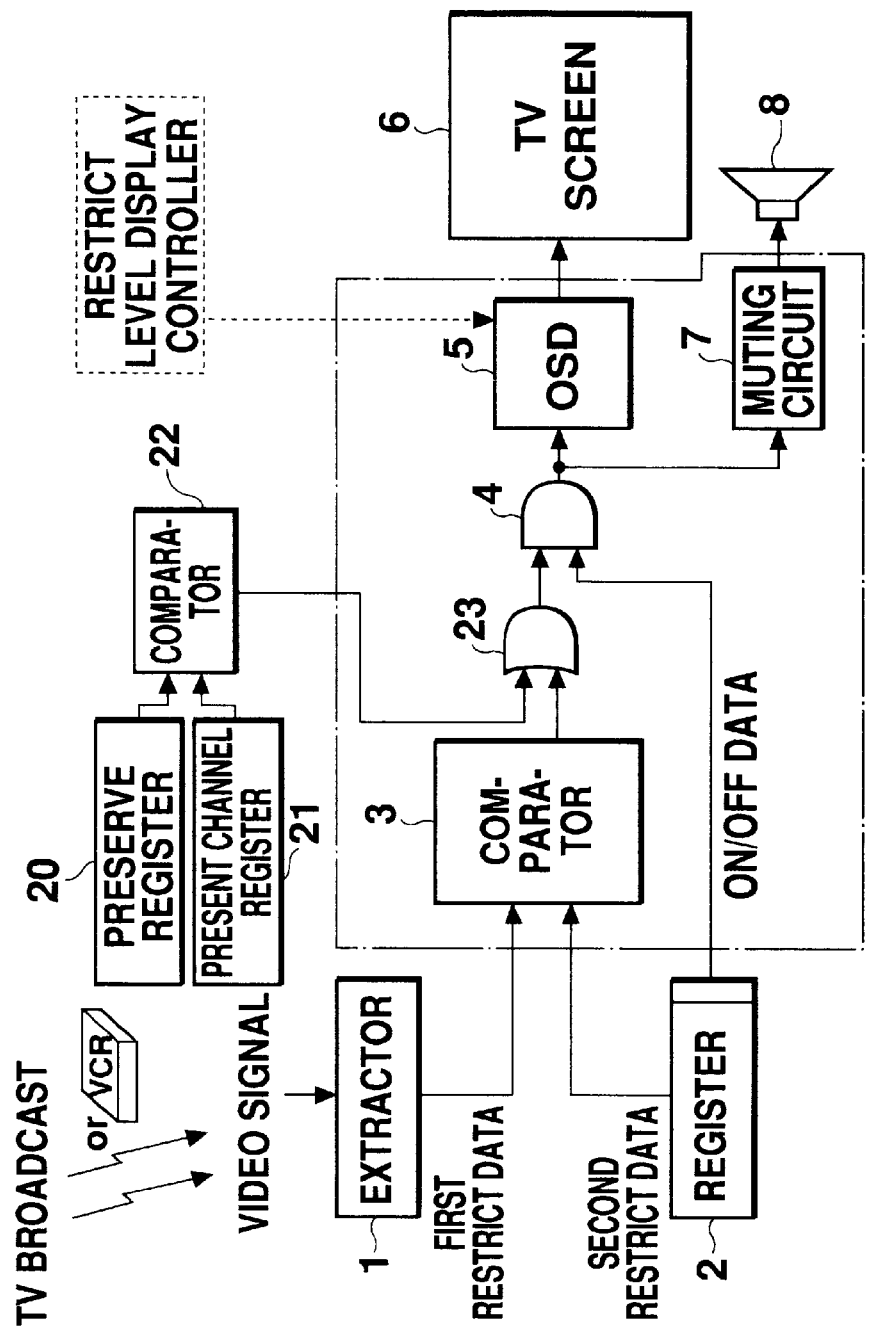
FIG. 5 is a block diagram depicting an image display control device in a second embodiment of the present invention.

FIG. 5 is a block diagram showing the second embodiment of the image display control device of the present invention, wherein parts corresponding to those of FIG. 1 are indicated by the same reference characters as those of FIG. 1. Detailed explanation of these parts will not be repeated.

In FIG. 5, there is a present channel register (21) into which is set binary data indicating the channel broadcasting the program presently being viewed on the TV receiver and a preserve register(20). When the 1-bit data in register (2) is logical "1" and specifies that viewing is to be prohibited, and logical "1" output from comparator (3) which functions here as a first comparator (namely, first restrict data from the source) has a stricter restrict level than restrict data set at the TV receiver viewing side (namely, second restrict data at the destination), OR gate (23) outputs logical "1" to AND gate (4). When AND gate (4) outputs this logical "1", the contents of the present channel register (21) are also set into the preserve register (20). Comparator (22) may be a channel comparator which functions as a second comparator for comparing the contents of present channel register (21) and preserve register (20) and determines whether or not they match. When the contents of present channel register (21) and preserve register (20) match, comparator (22) outputs logical "1". The outputs from both comparators (3) and (22) are applied to OR gate (23).

In the configuration described above, when a video scene which is educationally inappropriate for children (for instance, a video scene depicting extreme violence, sexual behaviour, or the like) appears during a broadcast while the user is viewing a program on channel A, and first restrict data which is stricter than second restrict data is multiplexed onto 21H of the vertical retrace period of the video signal used to broadcast that program, the comparator (3) outputs logical "1". If the 1-bit data in register (2) is logical "1" specifying "enable" (ON) for the viewing prohibition operation, the OR gate (23) logical "1" and the register (2) logical "1" are both applied to AND gate (4). AND gate (4) outputs logical "1", thereby initiating operation of the OSD (5) which replaces the video scene on the TV screen (6) with a predetermined color display, preventing children from viewing the video scene. Simultaneously, muting circuit (7) mutes the audio signal synchronised with the video scene in accordance with logical "1" which is input thereto from AND gate (4). In addition, data representing channel A is set in the present channel register (21). Moreover, present channel register (21) receives the logical "1" output from AND gate (4) and the contents thereof are also set in preserve register (20). In other words, when the comparator (22) outputs a matching logical "1" value, viewing of the video scene is prohibited using either of the outputs of comparators (3) or (22) (state X).

Next, from state X, let us consider a case when the user has changed from the program on channel A, which requires restriction, to channel B which is broadcasting a program not requiring restriction, perhaps a sports program. In this case, since the first restrict data has a more lenient restrict level than the second restrict data, comparator (3) outputs logical "0". Data representing channel B is set in the present channel register (21), but, since data representing channel A remains in the preserve register (20), comparator (22) outputs non-matching logical "0". Therefore, both OR gate (23) and AND gate (4) output logical "0". As a result, the contents of the present channel register (21) are not set into the preserve register (20) and the video data are displayed unaltered on the TV screen (6) (state Y).

From state Y, when the user changes the channel from channel B back to channel A, data representing channel A is set in the present channel register (21). Now, due to the time lag caused by the fact that first restrict data is multiplexed only at intervals of between a few seconds to a few minutes, (alternatively, a similar time lag is caused when the TV receiver is unable to receive first restrict data due to some type of malfunction) it is possible that first restrict data may not be applied to comparator (3) when channel A data is set into the present channel register (21). Here, even if first restrict data is not being applied to the comparator (3), for instance, comparator (22) nevertheless outputs logical "1" since the contents of the present channel register (21) and the preserve register (20) match the channel A data. Consequently, the video scene is prohibited from being displayed on the TV screen (6) from the moment at which channel B is switched to channel A.

As a result, according to the second embodiment of the present invention, even when the user is a child who, after viewing a program containing video scenes requiring restriction, has switched to a program which does not require restriction, and has then switched once again to the program containing video scenes requiring restriction, viewing of such video scenes regarded as inappropriate for the education and growth of children can be prohibited during the period lasting from the moment of the latter channel switch and ending when first restrict data is applied to the comparator (3) by utilising the output of comparator (22) in place of comparator (3).

Furthermore, as FIG. 5 shows, in addition to the configuration described above, a restrict level display controller identical to that shown in FIG. 1 may be provided for controlling the OSD (5) to display the difference in display restrict levels of the first and second restrict data on the TV screen (6) in accordance with the comparison between the first and second restrict data performed by comparator (3). As in the first embodiment, it is thus possible to know the extent of the restrict level difference between first restrict data multiplexed on the video signal and second restrict data set by the TV viewer.

Embodiment 3

In the second embodiment, when switching from a state of viewing video data corresponding to a video signal with a lenient display restrict level to a state of viewing video data corresponding to a video signal with a strict display restrict level, video and display audio output to the TV screen are prohibited until first restrict data can be extracted from the video signal which has been obtained after switching. In the third embodiment of the present invention, after switching from viewing one video signal to another video signal, display is prohibited for a predetermined period of time, irrespective of the display restrict levels of the video signals before and after switching.

Figure 6:
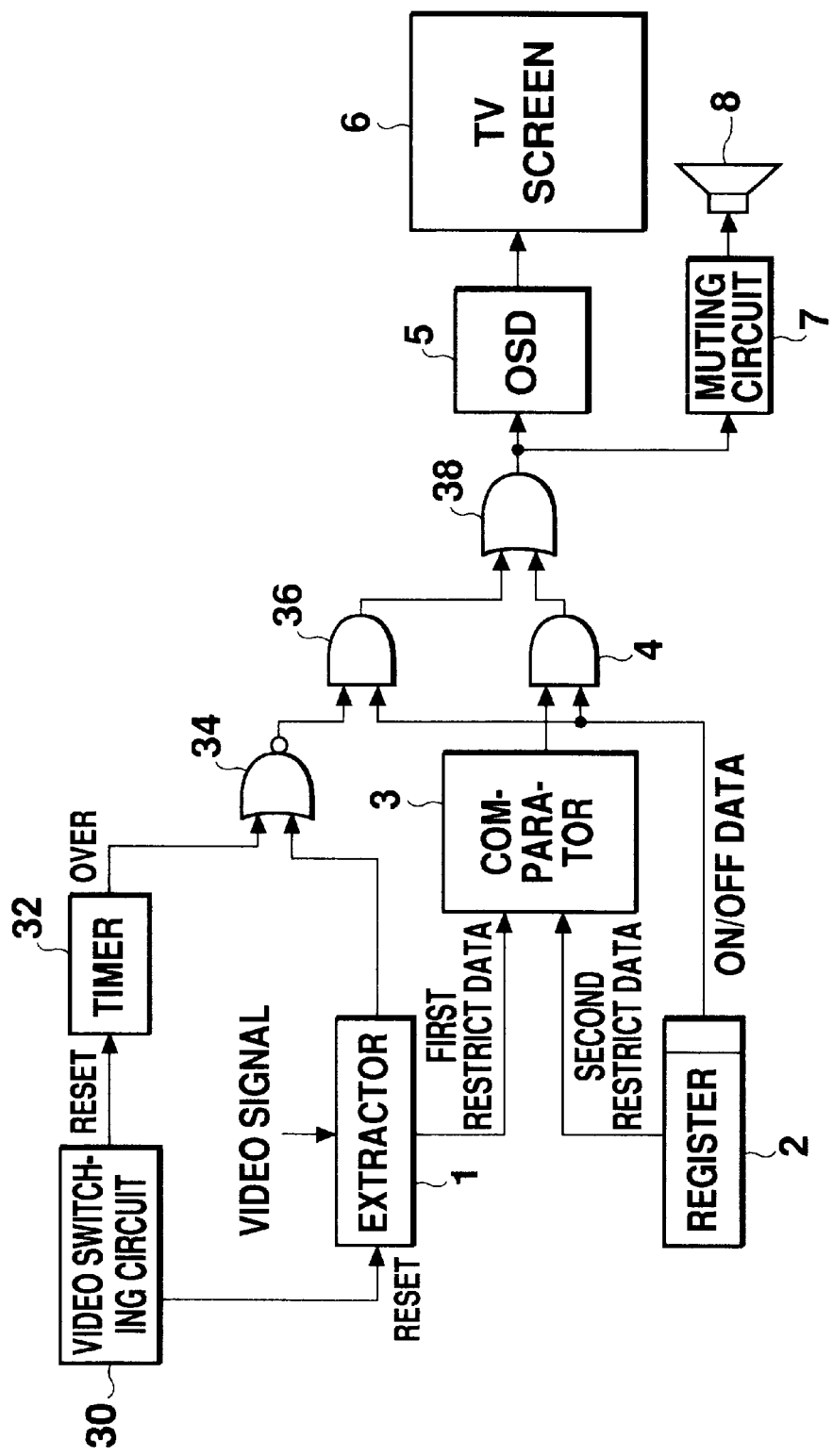
FIG. 6 is a block diagram depicting an image display control device in a third embodiment of the present invention.

FIG. 6 shows the configuration of the third embodiment. In FIG. 6, parts corresponding to those of FIG. 1 explained in the first embodiment are indicated by the same reference characters and their description is not repeated.

In accordance with a request from the user, a video switching circuit (30) switches channels at a broadcast receiver and switches input sources of video signals, and supplies reset signals to a timer (32) and an extractor (1).

For instance, after switching from a channel A video signal to a channel B video signal, when the extractor (1) has received a RESET signal from the video switching circuit (30), the extractor (1) detects first restrict data in the video signal now being broadcast on channel B and supplies a confirm signal "1" to one of the inputs of a NOR gate (34). Furthermore, the timer (32) measures a predetermined period of time from the generation of the RESET signal and, when that period has elapsed, supplies an OVER signal to the other input of NOR gate (34). Consequently, before a predetermined time period has elapsed from the generation of the RESET, namely before timer (32) outputs the OVER signal and extractor (1) outputs the confirm signal "1", in other words, during the period until extractor (1) detects first restrict data on the channel B video signal, the NOR gate (34) outputs "1". As a result, if display restrict mode is set to ON [namely, when ON/OFF data from register (2) is "1"] the "1" outputs from the register (2) and the NOR gate (34) are supplied to an AND gate (36) which then outputs "1". Since the "1" output from AND gate (36) is supplied to one of the inputs of an OR gate (38), OR gate (38) outputs "1" irrespective of whatever signal is supplied to the other input of OR gate (38) from AND gate (4).

In other words, in the third embodiment, when display restrict mode is set to ON, in the case where the input source of the video signal has been switched from A to B, video data is prohibited from being displayed on the TV screen (6) during the period lasting from the moment the switch until the timer (32) generates an OVER signal or until the extractor (1) detects first restrict data from the post-switch B video signal. Simultaneously, audio output to speaker (8) is prohibited.

Furthermore, after switching, even before timer (32) has output an OVER signal, if extractor (1) succeeds in extracting first restrict data from the B video signal, the image display control device of the third embodiment permits or prohibits video data display to the TV screen (6) and the corresponding audio output in compliance with the result of a comparison between first and second restrict data, as in the first and second embodiments.

Here, when first restrict data is definitely multiplexed onto the video signal which has been transmitted from a video input source and supplied to extractor (1), timer (32) and NOR gate (34) are not required. However, in a case where an input source might be selected which is not multiplexing restrict data, it is possible to prevent video data display even though no display restrict data is multiplexed onto the corresponding post-switch video signal by providing the timer (32) as shown in FIG. 6 in order to output an OVER signal after a predetermined period of time has elapsed since switching sources.

For instance, having switched from display-restricted channel A to channel B which has no display restrictions (absolutely no first restrict data has been multiplexed), no first restrict data is output by the extractor (1). Therefore, unless a timer (32) has been provided, it is not possible to cancel the display-prohibit state of the video data after the switch. By providing a timer (32) capable of measuring a predetermined period of time from the switch and outputting an OVER signal when that predetermined time period has elapsed, the display-prohibit can reliably be cancelled, as long as the post-switch video data has no display restrictions.

The time period measured by the timer (32) may, for instance, be set to a slightly longer period than the interval at which first restrict data are multiplexed onto the video signal. Preferably, the period measured should be more than twice the multiplex interval, to ensure that in a case where, for instance, one batch of first restrict data has been lost due to radio wave damage or the like, a video scene with an inappropriate display restrict level is not mistakenly displayed.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. An image display control device for preventing viewing of video scenes included among video signals capable of being viewed on a television regarded as educationally inappropriate, comprising:

an extractor for extracting from a video signal first restrict data which has been multiplexed onto the video signal in a predetermined vertical retrace period thereof, said first restrict data representing any one of a plurality of display restrict levels ranging from a strict display restrict level for preventing viewing of video scenes regarded as educationally inappropriate to a lenient display restrict level;

a register in which is set second restrict data representing any one of the plurality of display restrict levels;

a display controller for comparing display restrict levels of the first restrict data and the second restrict data, prohibiting display of the video data on a television display when a display restrict level of the first restrict data is stricter than a display restrict level of the second restrict data, and permitting display of the video data on a television display when the display restrict level of the first restrict data is more lenient than the display restrict level of the second restrict data; and a restrict level display controller for controlling the display controller to display on the television display the difference between the display restrict level of the first restrict data and the display restrict level of the second restrict data, based on a comparison between the first and second restrict data performed by the comparator.

2. An image display control device according to claim 1, wherein the display controller further comprises:

a comparator for comparing the first restrict data with the second restrict data; and an on-screen circuit for displaying a predetermined display color on the display-screen when an output of the comparator has indicated that the display restrict level of the first restrict data is stricter than the display restrict level of the second restrict data.

3. An image display control device according to claim 2, wherein the display controller further comprises:

a muting circuit for muting an audio output of the television when an output of the comparator has indicated that the display restrict level of the first restrict data is stricter than the display restrict level of the second restrict data.

4. An image display control device according to claim 1, wherein the restrict level display controller comprises:

a register, in which data representing a first color is set when the display restrict level of the first restrict data is stricter than the display restrict level of the second restrict data, and in which data representing a second color differing from the first color is set when the display restrict level of the first restrict data is more lenient than the display restrict level of the second restrict data; and wherein based on contents of the register, the on-screen display displays a relative relation between the display restrict level of the first restrict data and the display restrict level of the second restrict data using colors on the display-screen.

5. An image display control device according to claim 1, wherein the restrict level display controller controls the on-screen circuit to display a predetermined display on the display-screen when the display restrict level of the first restrict data does not match the display restrict level of the second restrict data.

6. An image display control device according to claim 1, wherein the restrict level display controller controls the on-screen circuit to flash a predetermined text on the display-screen when the display restrict level of the first restrict data does not match the display restrict level of the second restrict data.

7. An image display control device for obtaining video data capable of being viewed on a television from a video signal and displaying said video data on a display-screen of the television, wherein, in accordance with moral contents of the video signal, the video signal is ranked at any one of a plurality of display restrict levels ranging from a strict display restrict level to a lenient display restrict level, and first restrict data for restricting display on the display-screen is multiplexed onto the video signal in accordance with a display restrict level at which the video signal has been ranked;

said image display control device further comprising:

an extracting circuit for extracting the first restrict data which has been multiplexed onto the video signal;

a second restrict data storing circuit for storing second restrict data which corresponds to a display restrict level desired by a viewer;

a display controller for comparing display restrict levels of the first restrict data and the second restrict data, and prohibiting display of the video data on a television display when a display restrict level of the first restrict data is stricter than a display restrict level of the second restrict data, and permitting display of the video data on a television display when the display restrict level of the first restrict data is more lenient than the display restrict level of the second restrict data; and a restrict level display controller for controlling the display controller to display on the display-screen the difference between the display restrict level of the first restrict data and the display restrict level of the second restrict data, based on a comparison between the first and second restrict data performed by the comparator.

8. An image display control device according to claim 7, wherein the first restrict data multiplexed onto the video signal in accordance with moral contents of the video signal comprises restrict data for preventing viewing of video scenes deemed to be educationally inappropriate.

9. An image display control device according to claim 7, wherein the display controller comprises:
   a comparator for comparing the first restrict data and the second restrict data; and
   a display color controller for altering a color displayed on the display-screen to a predetermined color when the comparator indicates that the display restrict level of the first restrict data is stricter than the display restrict level of the second restrict data.

10. An image display control device according to claim 8, wherein the display controller comprises:
    a comparator for comparing the first restrict data and the second restrict data; and
    a display color controller for altering a color displayed on the display-screen to a predetermined color when the comparator indicates that the display restrict level of the first restrict data is stricter than the display restrict level of the second restrict data.

11. An image display control device according to claim 9, wherein the display controller further comprises:
    a muting circuit for muting an audio output multiplexed onto the video signal based on an output of the comparator which indicates that a display restrict level of the first restrict data is stricter than a display restrict level of the second restrict data.

12. An image display control device according to claim 7, wherein the restrict level display controller comprises:
    a register, in which data representing a first color is set when the display restrict level of the first restrict data is stricter than the display restrict level of the second restrict data, and in which data representing a second color differing from the first color is set when the display restrict level of the first restrict data is more lenient than the display restrict level of the second restrict data; and wherein,
    based on contents of the register, the on-screen display displays a relative relation between the display restrict level of the first restrict data and the display restrict level of the second restrict data using colors on the display-screen.

13. An image display control device for obtaining video data capable of being viewed on a television from a video signal and displaying said video data on a display-screen of the television, wherein
    in accordance with moral contents of the video signal, the video signal is ranked at any one of a plurality of display restrict levels ranging from a strict display restrict level to a lenient display restrict level, and first restrict data for restricting display on the display-screen is multiplexed onto the video signal in accordance with a display restrict level at which the video signal has been ranked;
    said image display control device further comprising:
    an extracting circuit for extracting the first restrict data which has been multiplexed onto the video signal;
    a second restrict data storing circuit for storing second restrict data which corresponds to a display restrict level desired by a viewer;
    a display controller for comparing display restrict levels of the first restrict data and the second restrict data, and prohibiting display of the video data on a television display when a display restrict level of the first restrict data is stricter than a display restrict level of the second restrict data, and permitting display of the video data on a television display when the display restrict level of the first restrict data is more lenient than the display restrict level of the second restrict data; and a restrict level display controller for controlling the display controller to display a predetermined display on the display-screen when the display restrict level of the first restrict data does not match the display restrict level of the second restrict data, the predetermined display being based on a degree of the mismatch.

14. An image display control device according to claim 7, further comprising:
    a prohibit circuit, wherein,
        having switched from a first state of viewing video data corresponding to a video signal onto which has been multiplexed the first restrict data having a display restrict level more lenient than the display restrict level of the second restrict data to a second state of viewing video data corresponding to a different video signal onto which has been multiplexed the first restrict data having a stricter display restrict level than the second restrict data,
        during the period from the moment of switching from the first state to the second state until, after extracting the first restrict data multiplexed onto a video signal obtained in the second state from the video signal, the on-screen circuit is controlled by an output of the first comparator, and
        said prohibit circuit prohibits the video data in the second state from being displayed on the display-screen.

15. An image display control device according to claim 14, wherein
    the display controller compares the first restrict data and the second restrict data in the first state and the second state, and when a result of the comparison indicates that the display restrict level of the first restrict data is stricter than the display restrict level of the second restrict data, the display controller alters a color to be displayed on the display-screen to a predetermined color.

16. An image display control device for obtaining video data capable of being viewed on a television from a video signal and displaying said video data on a display-screen of the television, wherein,
    in accordance with moral contents of the video signal, the video signal is ranked at any one of a plurality of display restrict levels ranging from a strict display restrict level to a lenient display restrict level, and first restrict data for restricting display on the display-screen is multiplexed onto the video signal in accordance with a display restrict level at which the video signal has been ranked;
    said image display control device further comprising:
    an extracting circuit for extracting the first restrict data which has been multiplexed onto the video signal;
    a second restrict data storing circuit for storing second restrict data which corresponds to a display restrict level desired by a viewer;
    a display controller for comparing display restrict levels of the first restrict data and the second restrict data, and prohibiting display of the video data on a television display when a display restrict level of the first restrict data is stricter than a display restrict level of the second restrict data, and permitting display of the video data on a television display when the display restrict level of the first restrict data is more lenient than the display restrict level of the second restrict data; and a present channel register into which is set data relating to a channel of video data presently being viewed on the display-screen;

a preserve register for preserving contents of the present channel register when an output of the first comparator which indicates that the display restrict level of the first restrict data is stricter than the display restrict level of the second restrict data;

a channel comparator for comparing contents of the present channel register with contents of the preserve register and, when both said contents match, controlling the on-screen circuit to prohibit viewing of the corresponding video data, irrespective of the output of the first comparator; and wherein, having switched from a first state of viewing video data corresponding to a video signal onto which has been multiplexed the first restrict data having a display restrict level stricter than the display restrict level of the second restrict data to a second state of viewing video data corresponding to a different video signal onto which has been multiplexed the first restrict data having a more lenient display restrict level than the second restrict data, and having thereafter switched once again to the first state, during the period from the moment of switching from the second state to the first state until, after extracting the first restrict data multiplexed onto a video signal obtained in the second state from the video signal, the on-screen circuit is controlled by an output of the first comparator, the video data is prohibited from being displayed on the display-screen of the television in compliance with an output of the channel comparator.

17. An image display control device according to claim 16, wherein the display controller compares the first restrict data and the second restrict data in the first state and the second state, and when a result of the comparison indicates that the display restrict level of the first restrict data is stricter than the display restrict level of the second restrict data, the display controller alters a color to be displayed on the display-screen to a predetermined color.

18. An image display control device according to claim 7, wherein the first restrict data is multiplexed during a predetermined vertical retrace period of the video signal.

19. An image display control device according to claim 7, further comprising:

a switch time display controller, wherein, having switched from a first state of displaying video data corresponding to a video signal to a second state of displaying video data corresponding to a different video signal, the switch time display controller prohibits the video data in the second state from being displayed on the display-screen during the period from the moment of switching from the first state to the second state until the first restrict data multiplexed onto the video signal obtained in the second state is extracted from the video signal.

20. An image display control device according to claim 7, further comprising:

a switch time display controller, wherein, having switched from a first state of displaying video data corresponding to a video signal to a second state of displaying video data corresponding to a different video signal, the switch time display controller prohibits the video data in the second state from being displayed on the display-screen for a predetermined period of time from the moment of switching from the first state to the second state.

* * * * *